No. 794,069.

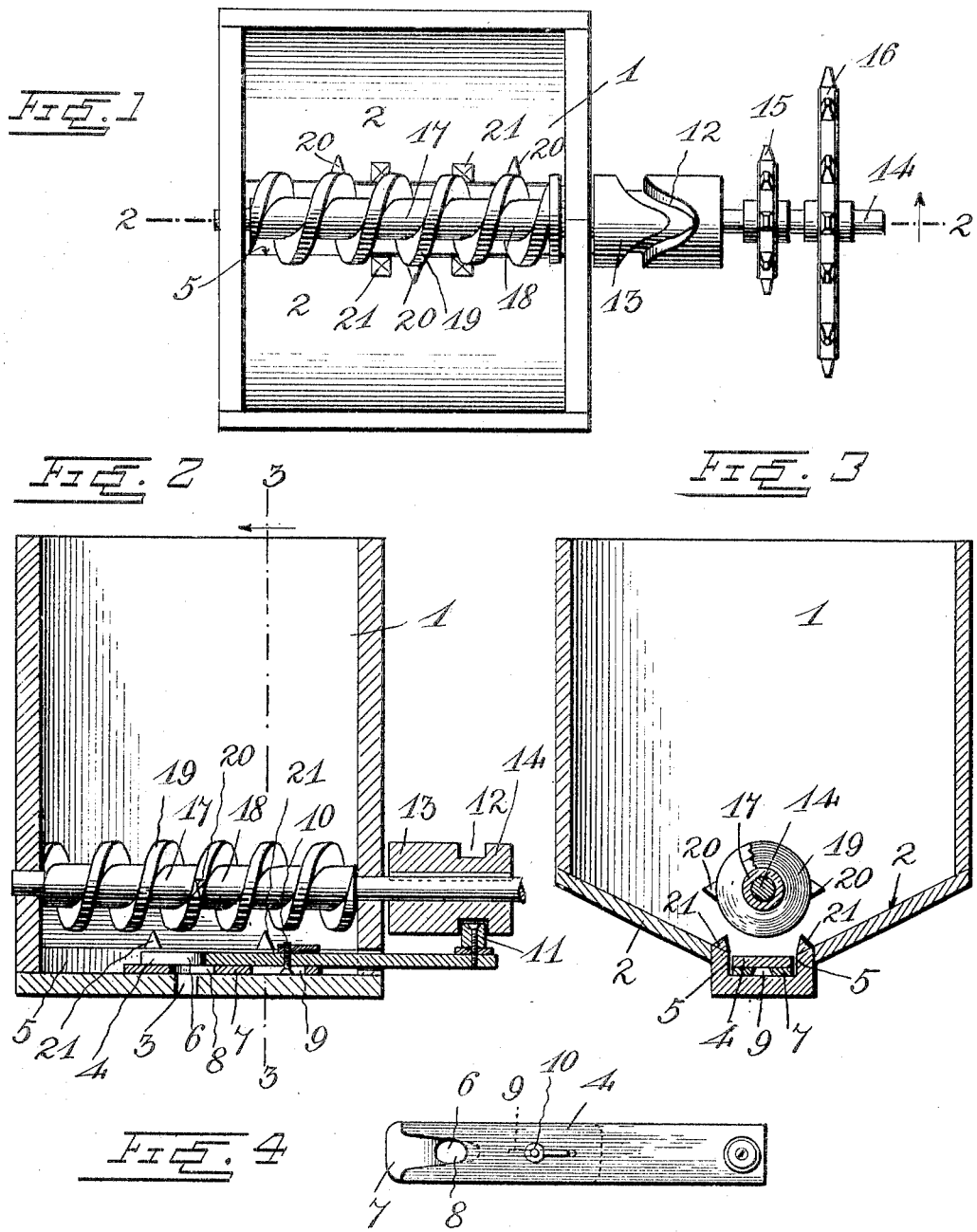

Patented July 4, 1905.

UNITED STATES PATENT OFFICE.

WILBERT E. ANGLUND, OF ALTUS, OKLAHOMA TERRITORY.

SEED-PLANTER.

SPECIFICATION forming part of Letters Patent No. 794,069, dated July 4, 1905.

Application filed June 5, 1905. Serial No. 263,817.

*To all whom it may concern:*

Be it known that I, WILBERT E. ANGLUND, a citizen of the United States, residing at Altus, in the county of Greer, Oklahoma Territory, have invented certain new and useful Improvements in Seed-Planters; and I do declare the following to be a full, clear, and exact description of the invention, such as will enable others skilled in the art to which it appertains to make and use the same.

My invention relates to improvements in planters for corn, cotton, and the like, and more particularly to seed-dropping mechanism therefor.

The object of the invention is to improve and simplify the construction and operation of mechanisms of this character, and thereby render the same more efficient and durable in use and less expensive to manufacture.

With the above and other objects in view the invention consists of certain novel features of construction, combination, and arrangement of parts, as will be hereinafter described and claimed.

In the accompanying drawings, Figure 1 is a top plan view of a hopper or seed-planter with my improved feed or dropping mechanism applied thereto. Fig. 2 is a longitudinal sectional view taken on the line 2 2 in Fig. 1. Fig. 3 is a detail transverse sectional view taken on the line 3 3 in Fig. 2, and Fig. 4 is a detail view showing the sliding valve and the means for adjusting the same.

Referring to the drawings by numeral, 1 denotes the hopper of a corn or cotton planter or similar machine, which has in its curved bottom 2 a discharge-opening 3, through which the grain passes into a shoe or drill. (Not shown.) Coacting with the discharge-opening 3 is a slide-valve 4, which is adapted to be reciprocated in a suitable guide 5 in the hopper-bottom 2 and which has an adjustable valve-opening 6, which is moved into or out of register or alinement with the opening 3 as the valve or slide 4 is reciprocated. The valve-opening 6 is preferably formed and adjusted by forming in one end of the slide 4 a notch or recess and by providing an adjusting-plate 7, which has an opening 8 adapted to register or aline with the opening in the end of the slide. The plate 7 is adjustably secured to the slide 4, preferably by forming the same with a slot 9, through which a clamping-bolt or similar device 10 upon the slide 4 projects, as clearly shown in Figs. 2 and 4 of the drawings.

The slide or valve 4 is reciprocated by providing upon its outer end, which extends through one side of the hopper, a friction-roller 11, which projects into and runs in an irregular cam-groove 12, formed in an enlarged portion or hub 13 upon the outer end of a shaft 14, which extends through the hopper above and in line with the slide or valve 4. Suitable sprocket-wheels 15 16 or other driving elements may be provided upon the shaft 14 for the purpose of rotating the latter, which as its grooved portion or hub 12 revolves will cause the slide or valve 4 to be reciprocated to open and close the discharge-opening 3 in the bottom of the hopper. In order to facilitate the feed of corn, cotton, or other grain or seed through the openings 3 and 6 after agitating the same within the hopper, I provide upon the shaft 14 within the hopper an agitating-cylinder 17, which is provided with a spiral groove or channel 18, which forms a spiral rib 19. This rib 19 may be provided at suitable intervals with projections or teeth 20, which rotate between similar projections or teeth 21 upon the bottom of the hopper for the purpose of preventing cotton-seed and the like from sticking or clinging together.

The construction, use, and advantages of my invention will be readily understood from the foregoing description, taken in connection with the accompanying drawings. It will be seen that when the shaft 14 is rotated the seed or grain within the hopper will be agitated and fed by the cylinder to the discharge of the hopper and that it will be permitted to pass therethrough at each reciprocation of the slide or valve 4. By adjusting the plate 7 the size of the valve-opening may be varied to permit a greater or less quantity of seed to be dropped by the mechanism.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a seed-dropping mechanism, the combination of a hopper having a discharge-opening, a slide-valve to coact therewith, a shaft extending through said hopper, a feeding and agitating device upon said shaft within said hopper, a cam upon said shaft and means upon said valve to coact with said cam whereby said valve will be reciprocated, substantially as described.

2. In a seed-dropping mechanism, the combination of a hopper having a discharge-opening, an apertured sliding valve to coact with said discharge-opening, means for adjusting the opening in said valve, a shaft in said hopper, a spiral agitating device upon said shaft within the hopper, a hub upon said shaft formed with a cam-groove, and a friction-roller upon said sliding valve to coact with said cam-groove, substantially as described.

3. In a seed-dropping mechanism, the combination of a hopper having a discharge-opening, a guide in the bottom of said hopper, a valve-plate slidable in said guide and formed with an aperture or recess, an adjustable plate formed with an aperture to coact with the aperture in said valve-plate, means for adjustably securing said plates together, a shaft in said hopper, a spirally-grooved agitator upon said shaft within the hopper, coacting teeth upon said agitator and the bottom of said hopper, a hub upon the outer end of said shaft formed with a cammed groove, a friction-roller upon said valve-plate to coact with said cam-groove, and means upon said shaft for rotating the same.

In testimony whereof I have hereunto set my hand in presence of two subscribing witnesses.

WILBERT E. ANGLUND.

Witnesses:
JAMES E. COEN,
H. A. ARMSTRONG.